(No Model.)
W. M. DEUTSCH.
FILTER.
No. 471,811. Patented Mar. 29, 1892.
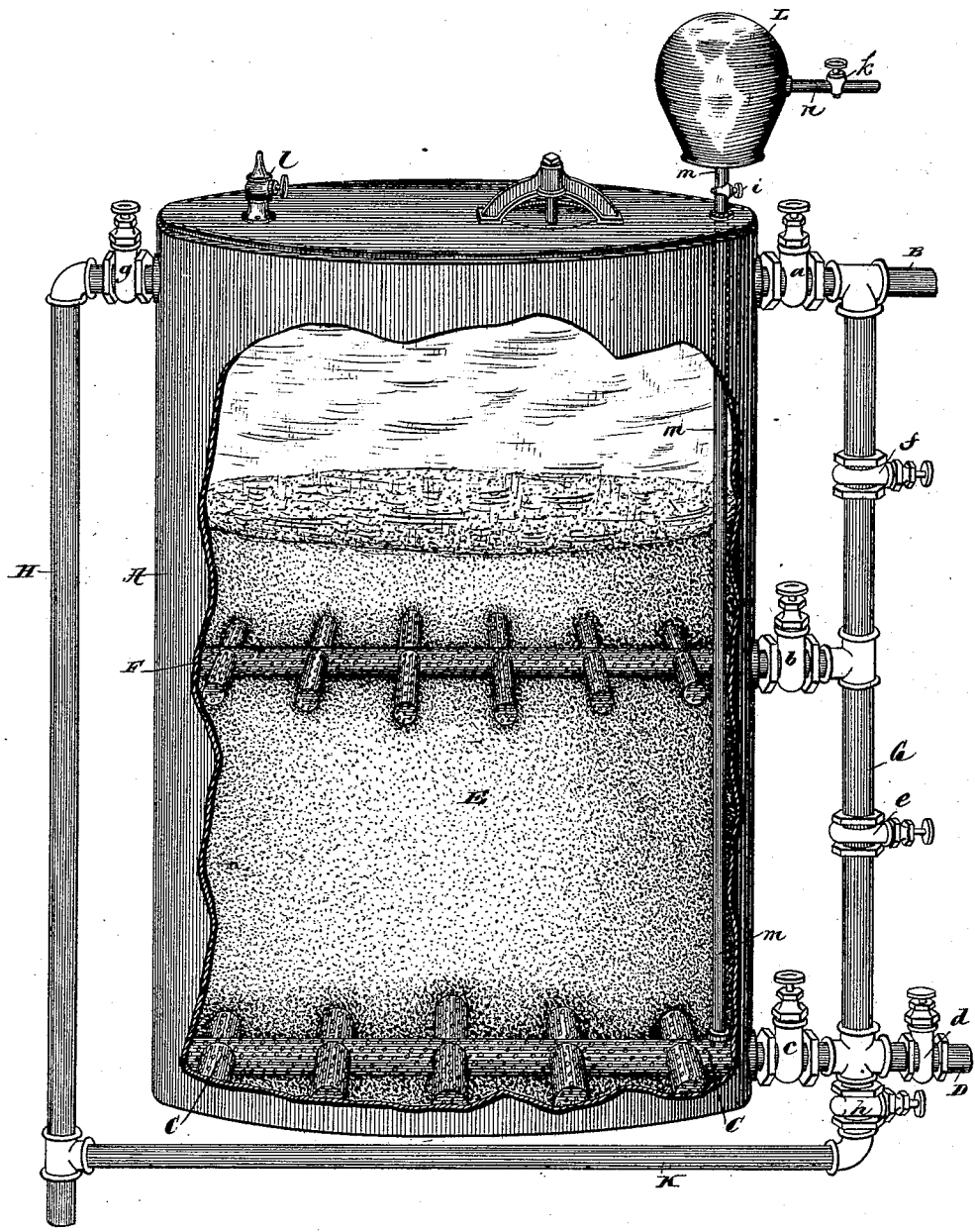

UNITED STATES PATENT OFFICE.

WILLIAM M. DEUTSCH, OF ELIZABETH, NEW JERSEY.

FILTER.

SPECIFICATION forming part of Letters Patent No. 471,811, dated March 29, 1892.

Application filed October 8, 1887. Serial No. 251,854. (No model.)

*To all whom it may concern:*

Be it known that I, WILLIAM M. DEUTSCH, a citizen of the United States, residing at Elizabeth, in the county of Union and State of New Jersey, have invented certain new and useful Improvements in Methods of and Apparatus for Purifying Filter-Beds, fully described and represented in the following specification and the accompanying drawing, forming a part of the same.

This invention relates to a method of and apparatus for cleansing and purifying a filter-bed by means of aeration.

In filtering water by means of a bed of granular material the effectiveness of the bed and the quality of the filtration can be materially increased and improved by causing air to be periodically disseminated throughout the bed. The air thus diffused throughout the bed will be retained for some time in the interstices of the material of the bed and will act not only to oxidize and destroy many of the impurities which are lodged in the bed, thus purifying the bed, but will also impart life and freshness to the filtered water. The air for this purpose may be introduced into the bed in a variety of ways and at different periods in the filtering operation; but I have found that the best results can be effected by introducing the air into the bed immediately after the bed has been subjected to the usual washing by means of a reversed current.

A full understanding of the apparatus constituting the invention can be best given by an illustration and a detailed description of a practical embodiment of the same. Such description will therefore be given, reference being had to the accompanying drawing, which shows the improvements as applied to a well-known form of filter.

Referring to said drawing, it is to be understood that the filter therein shown is of substantially the form and construction of the now well-known "National Filter." It consists of a closed body A, which communicates near its top with the inlet-pipe B, and is provided at or near its bottom with a series of perforated pipes C, which communicate with the discharge-pipe D. The filter-bed E, of granular material, fills the filter for about two-thirds or three-fourths of its height. Located in the bed E, near its upper surface, are a series of perforated washing-pipes F, which communicate with a vertical pipe G, which in turn communicates with both the inlet and discharge pipes.

The filter is provided near its top with the usual overflow or waste pipe H. The several pipes just mentioned are provided with cocks or valves *a b c d e f g*, the purpose of which will appear when the operation of the filter is explained. The filter as thus far described is, as before stated, substantially the same as the "National Filter" before referred to.

Located in some convenient position, preferably above the filter, is an air-chamber L, which communicates by a pipe *m*, controlled by a cock or valve *i*, with the perforated pipe C at the bottom of the bed E. The chamber L may also be provided with an inlet *n*, controlled by a cock or valve *k*. The discharge-pipe D is also provided between the filter and the valve *d* with a branch K, which is controlled by a cock or valve *h*, and communicates with the overflow-pipe H or other discharge for waste water. The filter is also provided at its top with a petcock *l*.

The operation of washing and aerating the filter-bed with the apparatus thus organized is as follows: Before commencing the filtering operation the water is drawn out of the filter, if the filter is not already empty, and the petcock *l* is opened so as to allow the part of the filter above the bed to be filled with air. The cock *l* is then closed and the water allowed to enter the filter through the pipe B. The air confined in the space above the bed E will then be forced downward through the bed, where a part of it will remain in the interstices of the bed, thus aerating and purifying the bed, while the remainder will be forced into the pipes C, and will pass thence through the pipe *m* into the chamber L, where (the cock *k* being closed) it will be confined under a pressure equal to the pressure of the water passing through the filter. The cock *i* will then be closed and the filtering will proceed until the bed needs washing. The manner of washing the bed is substantially the same as set forth in my prior Letters Patent, No. 355,004, dated December 28, 1886. When only the top of the bed requires washing, it may be washed with either filtered or unfiltered water. If filtered water is used, the valves *a, c,* and *f* will be closed and *b*, *e*, and *g* opened. The water from the pipe D will then pass through the pipes G F and upward through the top portion of the bed, carrying with it the impurities, which will be carried off with the water through the pipe H. To wash with unfiltered water, the operation is the same, except that the valve *e* will be closed and *f* opened. When the whole bed requires washing, it may also be done with either filtered or unfiltered water. If filtered water is used, the valves *a*, *e*, and *f* will be closed and *c g* opened. The water from the pipe D will then flow into the pipes C and pass upward through the whole bed and out through the pipe *h*. To wash with unfiltered water, the operation is the same, except that the valves *d b* are closed and *e f* opened.

If after any of the washings just described or at any other time it is desired to aerate the bed, the water is first drawn out of the filter, which can be done by closing the valves *a*, *f*, and *d* and opening the valve *h*. The water in the filter will then flow out through the pipes C K to the waste-pipe H. At the same time this is done the cock *l* is opened, so as to allow the upper part of the filter to be filled with air. When the water has been drawn out of the filter, the valve *h* will be closed and the cock *i* opened. The air confined in the chamber L under pressure will then expand and pass out through the perforations in the pipes C and upward through the bed, and by this means be disseminated throughout the interstices among the material of the bed, so as to thoroughly aerate and purify the same. The bed having been thus aerated the cock *l* and the valves *g*, *f*, *b*, and *h* will be closed and *a*, *c*, and *d* opened and the filtering resumed. As soon as the filtering is resumed the chamber L will be refilled with air under pressure in the manner already explained. The effect of the aeration thus given to the bed will last for a considerable time, so long in fact that it will not usually be necessary to aerate the bed more frequently than it is washed.

In some cases it may be desirable to supply the air to the chamber L from some source independent of the filter, as from a compressor communicating with the pipe *n*, and in such case the cock *l* may be omitted; or when the waste-pipe H does not communicate with a sewer or other place where the air is impure the air to fill the upper part of the filter may be drawn in through that pipe and be controlled by the valve *g*, and in such case the cock *l* may be omitted.

The means which is herein shown for introducing the air into the filter-bed is the best which I have yet devised and is well adapted for that purpose; but it may be varied without departing from the essential features of the invention.

What I claim is—

1. The combination, with a filter, of a perforated discharge-pipe located in the body of the filter, an air-chamber, an air-pipe leading therefrom and connected with the discharge-pipe, and means for controlling said air-pipe, whereby air may be forced from the discharge-pipe through the filter-bed when the filtering is suspended, substantially as described.

2. The combination, with a filter and its discharge-pipe, provided with the valve *l* for admitting air, of the air-chamber L and air-pipe *m*, controlled by cock *i* and connecting said air-chamber with the discharge-pipe, substantially as described.

In testimony whereof I have hereunto set my hand in the presence of two subscribing witnesses.

WILLIAM M. DEUTSCH.

Witnesses:
JNO. C. SYMONS,
JOSIAH MEDDEN.